US007954941B2

(12) United States Patent
Tedeschi (10) Patent No.: US 7,954,941 B2
(45) Date of Patent: Jun. 7, 2011

(54) COUPLING DEVICE WITH BREAKAWAY AND METHODS OF USING THE SAME (76) Inventor: Nancy Tedeschi, Rexford, NY (US)

( * ) Notice: Subject to any disclaimer, the term of this patent is extended or adjusted under 35 U.S.C. 154(b) by 320 days.

(21) Appl. No.: 12/196,227

(22) Filed: Aug. 21, 2008

(65) Prior Publication Data
US 2009/0051865 A1 Feb. 26, 2009

Related U.S. Application Data (60) Provisional application No. 60/965,528, filed on Aug. 21, 2007.

(51) Int. Cl.
G02C 11/02 (2006.01)
(52) U.S. Cl. .................................. 351/52; 351/51
(58) Field of Classification Search .............. 351/51, 351/52, 111, 121, 158, 41
See application file for complete search history.

(56) References Cited

U.S. PATENT DOCUMENTS

| 1,541,518 | A | 6/1925 | McCain |
| 1,662,834 | A | 3/1928 | Reiter |
| 2,177,978 | A | 10/1939 | Darvie |
| 2,230,984 | A | 2/1941 | Chernow |
| 2,382,019 | A | 8/1945 | Miller |
| 2,542,340 | A | 2/1951 | Mauraton |
| 2,552,265 | A | 5/1951 | Edwards |
| 3,307,444 | A | 3/1967 | Money |
| 3,968,661 | A | 7/1976 | Williams |
| 4,345,848 | A | 8/1982 | Cheselka |
| 4,968,128 | A * | 11/1990 | Mendola ................ 351/52 |
| 5,077,931 | A | 1/1992 | Marshall |
| 5,161,234 | A | 11/1992 | Nitta |
| 5,615,850 | A | 4/1997 | Cloninger |
| 5,651,652 | A | 7/1997 | Williams et al. |
| 5,675,988 | A | 10/1997 | Ignatowski |
| 5,699,140 | A | 12/1997 | Fuhrman |
| 5,863,168 | A | 1/1999 | Demarray |
| 5,896,184 | A | 4/1999 | Lowe et al. |
| 5,906,029 | A | 5/1999 | Fox |

(Continued)

FOREIGN PATENT DOCUMENTS
JP 4-46420 U 4/1992

OTHER PUBLICATIONS
Cameron & Barkley Company Catalog No. 26 (c) 1926 pp. 173, 187.

Primary Examiner — Hung X Dang
(74) Attorney, Agent, or Firm — Gerald F. Dudding; GFD Patents, LLC (57) ABSTRACT A coupling device with a breakaway tab and methods of using the same for operably coupling an ornament to a joint or hinge. The coupling device comprises an elongated body having openings at each end. One opening has been adapted to receive a screw of a joint or hinge, the other to receive an ornamental fastener. A breakaway tab or non-threaded portion of the elongated stem is provided to manipulate the screw and coupling device so the coupling device may be inserted between a head of the screw and a first surface of the joint or hinge. After engaging the threads in the hollow threaded channel of the hinge, and the screw has been essentially completely inserted into the hollow threaded channel of the hinge, the breakaway tab or non-threaded portion of the elongated stem of the screw may be broken off at a breakaway and discarded.

11 Claims, 8 Drawing Sheets

U.S. PATENT DOCUMENTS

| | | |
|---|---|---|
| 6,152,737 A | 11/2000 | Beaty et al. |
| 6,520,635 B1 | 2/2003 | Ignatowski |
| 6,863,394 B1 | 3/2005 | Nelson et al. |
| 7,665,839 B1 * | 2/2010 | Tedeschi .................. 351/52 |
| 2001/0048860 A1 | 12/2001 | Ross et al. |
| 2007/0228743 A1 | 10/2007 | Kawano |

* cited by examiner

COUPLING DEVICE WITH BREAKAWAY AND METHODS OF USING THE SAME

The present patent application is a non-provisional application claiming priority from provisional applications with Ser. No. 60/965,528 (filed Aug. 21, 2007 and titled "IBOB Specialized Double Washer").

FIELD OF THE INVENTION

The present invention relates generally to fasteners. More specifically, the invention relates to coupling devices and their uses in joints.

BACKGROUND

Small, hand held fastening devices are used in the mechanical and construction industries.

There is an increasing need for adaptations that facilitate the manipulation of such small, hand held fastening devices.

SUMMARY OF THE INVENTION

A first aspect of the present invention provides an ornamented eyeglass apparatus, comprising: an eyeglass frame; a first side piece, wherein a proximal end of the first side piece is operably coupled to a first end of the frame by a first hinge therebetween; and an ornament suspended from the apparatus, wherein the ornament is not directly suspended from either of the sidepieces or from a screw in the first or second hinge.

A second aspect of the present invention provides an ornamented eyeglass apparatus, comprising: an eyeglass frame; a first side piece, wherein a proximal end of the first side piece is operably coupled to a first end of the frame by a first hinge therebetween; a coupling device operably coupled to the hinge, comprising: an elongated body having first and second sections, wherein a first surface of each section has an opening therein, wherein the opening in the first surface of the first section has been adapted to receive a screw for operably coupling the coupling device to the hinge and the opening in the first surface of the second section has been adapted to receive an ornamental fastener; a breakaway tab, releasably coupled to the elongated body; and a breakaway, therebetween, wherein the breakaway is not between the breakaway tab and an end of the first section of the elongated body.

A third aspect of the present invention provides a method of inserting a coupling device in an eyeglass hinge, comprising: providing an eyeglass hinge from which the screw has been removed from a hollow threaded channel; providing a coupling device comprising: an elongated body having first and second sections, wherein a first surface of each section has an opening therein, wherein the opening in the first surface of the first section has been adapted to receive a screw for operably coupling the coupling device to the hinge and the opening in the first surface of the second section has been adapted to receive an ornamental fastener; a breakaway tab, releasably coupled to the elongated body; and a breakaway, therebetween, wherein the breakaway is not between the breakaway tab and an end of the first section of the elongated body; providing a screw having a head, and either an elongated stem having a threaded first portion adjacent to the head of the screw and a releasably coupled non-threaded second portion extending from the threaded first portion, and a breakaway therebetween, or an elongated stem having a threaded first portion adjacent to the head of the screw without a non-threaded second portion extending from the threaded first portion, a breakaway tab releasably coupled to the head of the screw and a breakaway therebetween; and inserting the coupling device between a head of the screw and a first surface of the hinge and rotating the screw, by aligning either the non-threaded second portion of the elongated stem with the opening in the first surface of the first section of the coupling device and with the hollow threaded channel of the hinge or the threaded first portion of the elongated stem without the non-threaded second portion extending from the threaded first portion by manipulating either the non-threaded second portion of the elongated stem and the breakaway tab of the coupling device or breakaway tab releasably coupled to the head of the screw and the breakaway tab releasably coupled to the elongated body so that the threaded first portion of the elongated stem engages the threads of the hollow threaded channel of the hinge.

DETAILED DESCRIPTION OF EMBODIMENTS OF THE INVENTION

FIGS. 1-5 depict a coupling device 10, comprising: an elongated body 14 having first and second sections 12, 13. A first surface 50 of each section 12, 13 has an opening 30, 25 therein. The opening 30 in the first surface 50 of the first section 12 has been adapted to receive a screw 70 and the opening 25 in the first surface 50 of the second section 13 has been adapted to receive an ornamental fastener 80. The coupling device 10, comprises a breakaway tab 37 releasably coupled to the elongated body 14 and a breakaway 35, therebetween, wherein the breakaway 35 is not between the breakaway tab 37 and an end A of the first section 12 of the elongated body 14.

Figure 1:
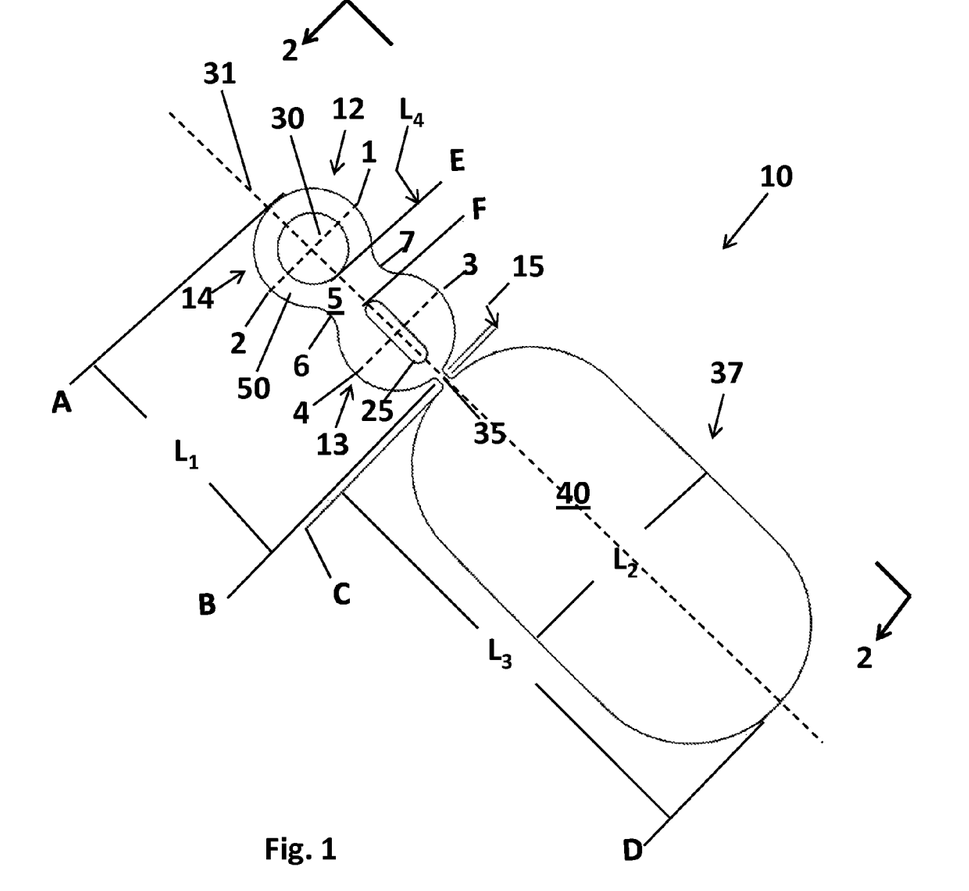
FIG. 1 depicts a top plan view of the coupling device, in accordance with embodiments of the present invention.

FIG. 1 depicts a top plan view of the coupling device 10. In one embodiment, a length $L_1$, between ends A and B of the elongated body 14 may be from about 0.225 in. to about 0.275 in. The openings 30 and 25 extend completely through both the first surface 50 and the surface facing away from the first surface 50.

In one embodiment, the centers of the opening 30, 25 may lie on a longitudinal axis 31 of the coupling device 10. A length from about 0.112 in. to about 0.138 in. may separate the centers of the opening 30, 25 along the longitudinal axis 31 of the coupling device 10.

Point E on the perimeter of opening 30, and point F on the perimeter of opening 25 define the nearest adjacent points along adjacent portions of the perimeter around each opening 30 and 25. In one embodiment, points E and F are separated by a length $L_4$ that is from about 0.035 in. to about 0.045 in.

In one embodiment, the opening 30 may be oval and have a diameter from about 0.0675 in. to about 0.0825 in.

In one embodiment, the opening 25 may be elliptical and have a width of from about 0.020 in.+/−10% and a length from about 0.066+/−10%.

In one embodiment, the first and second sections 12 and 13 of the elongated body 14 of the coupling device 10 are lobes of a planar figure eight that are co-planar with the first surface 50. The points 1, 2 define a diameter of the first end 12 and the points 3, 4 define a diameter of the second end 13 of the elongated body 14 of the coupling device 10. The first end 12 tapers from points 1, 2 to points 6 and 7 of a mid-section 5 between the first and second sections 12 and 13, and the second end 13 tapers from point 3, 4 to points 6 and 7 of the mid-section 5 between the first and second sections 12 and 13, so that the elongated body 14 has the shape of a planar figure eight. Hereinafter "taper" is defined as a gradual decrease in thickness or width of an elongated object to the points 6 and 7 of a mid-section 5 between the first and second sections 12 and 13. In this embodiment, the width $L_4$, between the points E and F of the midsection 5, is narrower than the diameters of either of the first and second sections 12 and 13.

In one embodiment, the diameter of the first and second sections 12, 13 may be from about 0.10 in. to about 0.13 in.

The breakaway 35 may releasably couple the elongated body 14 to the breakaway tab 37. Hereinafter, a "breakaway" is defined as a releasable coupling between the breakaway tab 37 and a distal end B of the elongated body 14. Hereinafter, "distal end of the elongated body 14" is defined as the further point along the elongated body 14 in reference to the opening 30 of the first end 12 of the elongated body 14.

For embodiments of the coupling device 10, the breakaway is advantageously not between the breakaway tab 37 and a proximal end A of the elongated body 14. Hereinafter, "proximal end of the elongated body 14" is defined as the nearer point along the elongated body 14 in reference to the opening 30 of the first end 12 of the elongated body 14.

Hereinafter "releasably coupling" or "releasable couple" is defined as forming or braking or cleaving or severing a mechanical and physical coupling between the distal end B of the elongated body 14 and the point C of the breakaway tab 37.

Hereinafter, "operably coupled" or "operable coupling" is defined as physically and mechanically attaching or joining, wherein the pieces attached or joined are free to rotate, pivot, or slide.

The coupling device 10, which includes the elongated body 14, the breakaway tab 37, and the breakaway 35, may be made of stainless steel, brass, nickel/sliver, carbon steel, titanium, or other appropriate metals or metal alloys.

In one embodiment, a width $L_2$ of the breakaway tab 37 may be from about 0.225 in. to about 0.275 in. and a length $L_3$ of the breakaway tab 37, between points C and D, may be from about 0.45 in. to about 0.55 in.

In one embodiment, a width of the breakaway 35 is less than or equal to 0.010 in.+/−10%, and a length of the breakaway 35 is less than or equal to from about 0.005 in. to about 0.007 in. when the diameter of the opening 30 is from about 0.0675 in. to about 0.0825 in.

Figure 2:
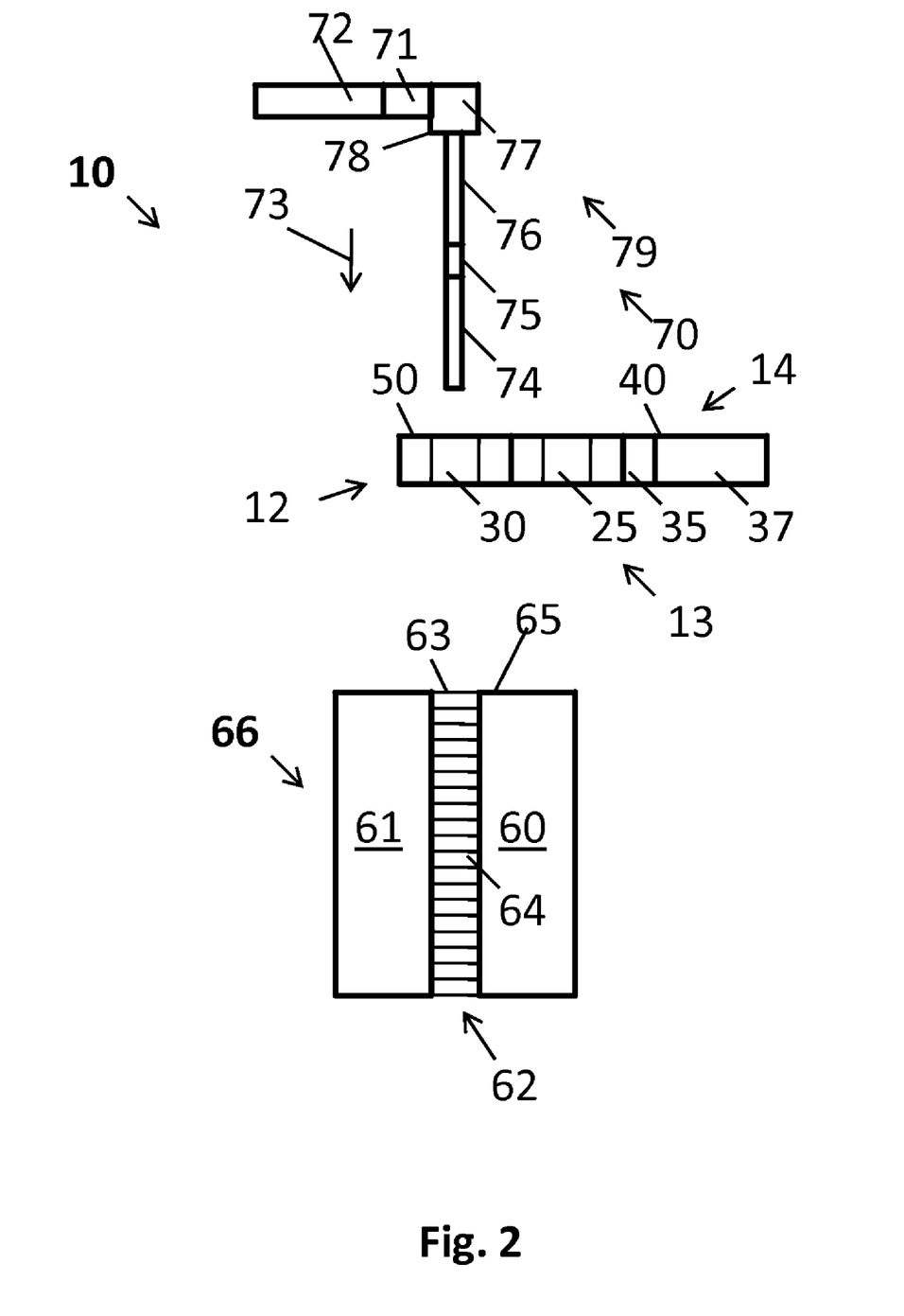
FIG. 2 depicts a longitudinal cross-sectional view of the coupling device, taken along the line 2-2, depicted in FIG. 1, in accordance with embodiments of the present invention.

FIG. 2 depicts a longitudinal cross-sectional view of the coupling device 10, taken along the line 2-2, depicted in FIG. 1, further comprising a screw 70 and a hinge 66, the hinge 66, comprising first and second straps 60, 61, pivotably coupled to a cylinder 62. The cylinder 62 has a hollow threaded channel 64 therein. The screw 70, comprises: a breakaway tab 74 and a breakaway 75 therebetween. The screw 70 may have a threaded first portion 76 and a non-threaded second portion 74 with a breakaway 75, therebetween. Alternatively, the screw 70 may have a threaded first portion 76 without the non-threaded second portion 74. In this embodiment, the screw head 77 of the screw 70 may be releasably coupled to a breakaway tab 72 with a breakaway 71 therebetween. The screw 70 has been disclosed in FIGS. 1A, 1B, 2A, 2B, 3A, and 3B, and associated text, therein, of U.S. patent application Ser. No. 12/187,254, dated Aug. 6, 2008 and disclosed by Nancy Tedeschi, the inventor of the present application, and is hereby incorporated by reference.

In one embodiment, the coupling device 10 may advantageously be installed between a first surface 78 of a screw head 77 and a first surface 65 of the hinge 66, and a second end 13 having an opening 25, such as a slit in it to hang specialized ornaments from. The coupling device 10 may advantageously be installed by inserting the non-threaded second portion 74 of the screw 70 in the direction of the arrow 73 into the opening 30, and further into the hollow threaded channel 64 of the hinge 66.

The non-threaded second portion 74 of the screw 70 has been inserted into the hollow threaded channel 64 in the hinge 66 so that the threaded first portion 76 of the screw 70 catches at least one of the threads 63 of the hollow threaded channel 64 of the hinge 66. The screw 70 is tightened into the hollow threaded channel 64 by rotating the non-threaded second portion 74 clockwise so that the first surface 78 of the screw head 77 becomes coplanar with the first surface 50 of the first end 12 of the elongated body 14.

Alternatively, in the embodiment in which the screw 70 may have a threaded first portion 76 without the non-threaded second portion 74, and the breakaway tab 72 releasably coupled to the screw head 77, the screw 70 may be tightened into the hollow threaded channel 64 by rotating the breakaway tab 72 and the threaded first portion 76 clockwise so that the first surface 78 of the screw head 77 becomes coplanar with the first surface 50 of the first end 12 of the elongated body 14. Hereinafter "releasably coupling" or "releasably coupled" is defined as forming or braking or cleaving or severing a mechanical and physical coupling between end C of the breakaway tab 37 and the distal end B of the elongated body 14.

Having the breakaway tab 37 releasably coupled to the distal end B of the elongated body 14 with the breakaway 35 therebetween, or releasable coupled to the screw head 77, advantageously enables installation of the elongated body 14, for example, the double washer, by inserting the screw 70 through the opening 30 and threading the threaded first portion 76 of the screw 70 into the hollow threaded channel 64 so that the first surface 78 of the screw head 77 becomes coplanar with the first surface 50 of the first end 12 of the elongated body 14 without obstruction or interference from any irregularities in the surface 40 of the breakaway tab 37 or non-planarity with the first surface 50 of the elongated body 14 because the breakaway tab 37 is not releasably coupled to the proximal end A of the elongated body 14. Likewise, the subsequent breaking off of the breakaway tab 37 from the breakaway 35 is not obstructed or interfered with by installing the elongated body 14 by making the first surface 78 of the screw head 77 flush with and tightened against the first surface 50 of the elongated body because the breakaway tab 37 is not releasably coupled to the proximal end A of the elongated body 14

The elongated body 14, for example, the double washer, may be in varying sizes and shapes. The breakaway tab 37 may be attached to the double washer by a breakaway 35 and after installation of the double washer may be broken off at the breakaway 35.

Figure 3:
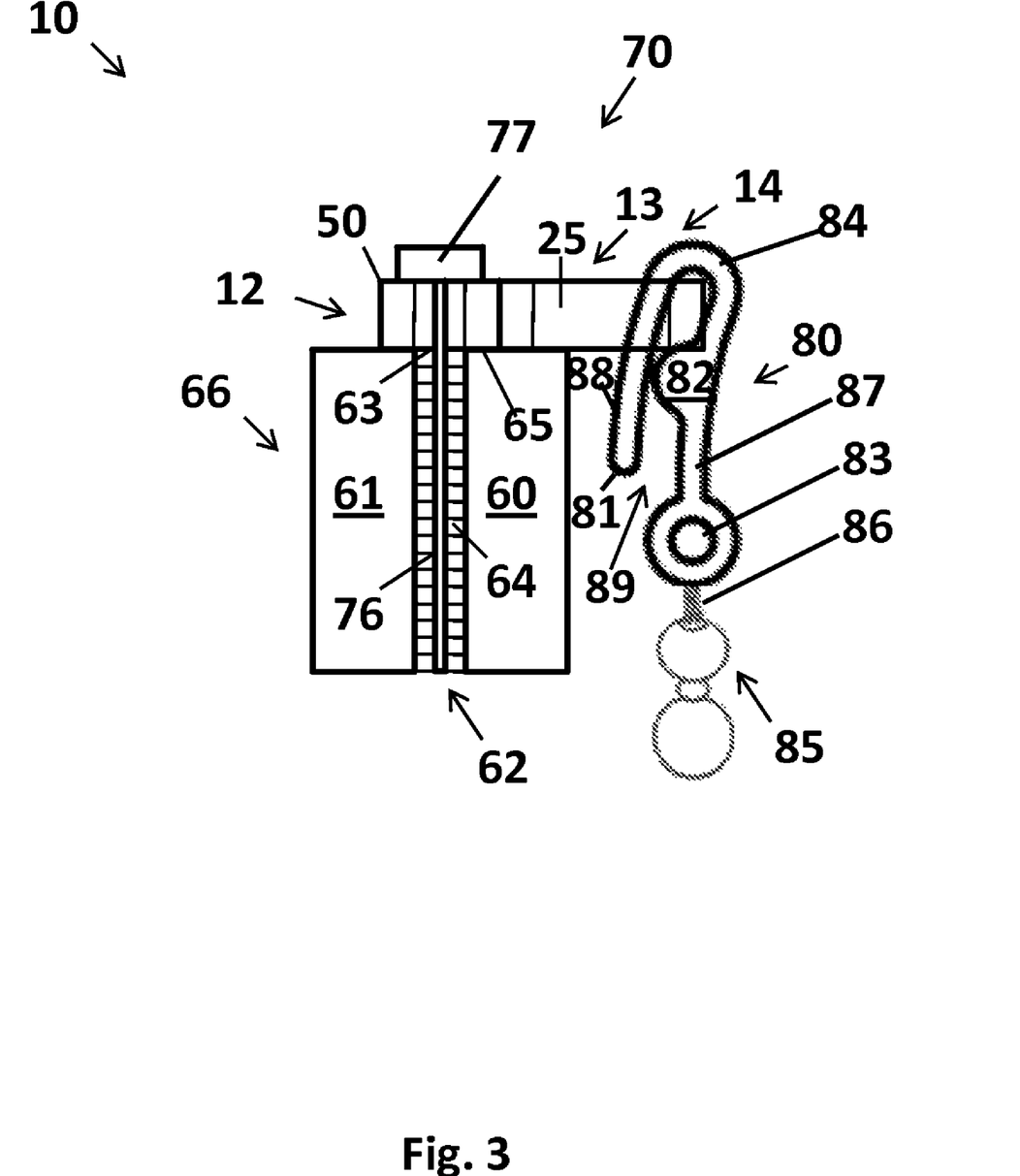
FIG. 3 depicts a longitudinal cross-sectional view of the coupling device, depicted in FIG. 2, and an exploded longitudinal cross-sectional view of the coupling device, depicted in FIG. 5, in accordance with embodiments of the present invention.
Figure 5:
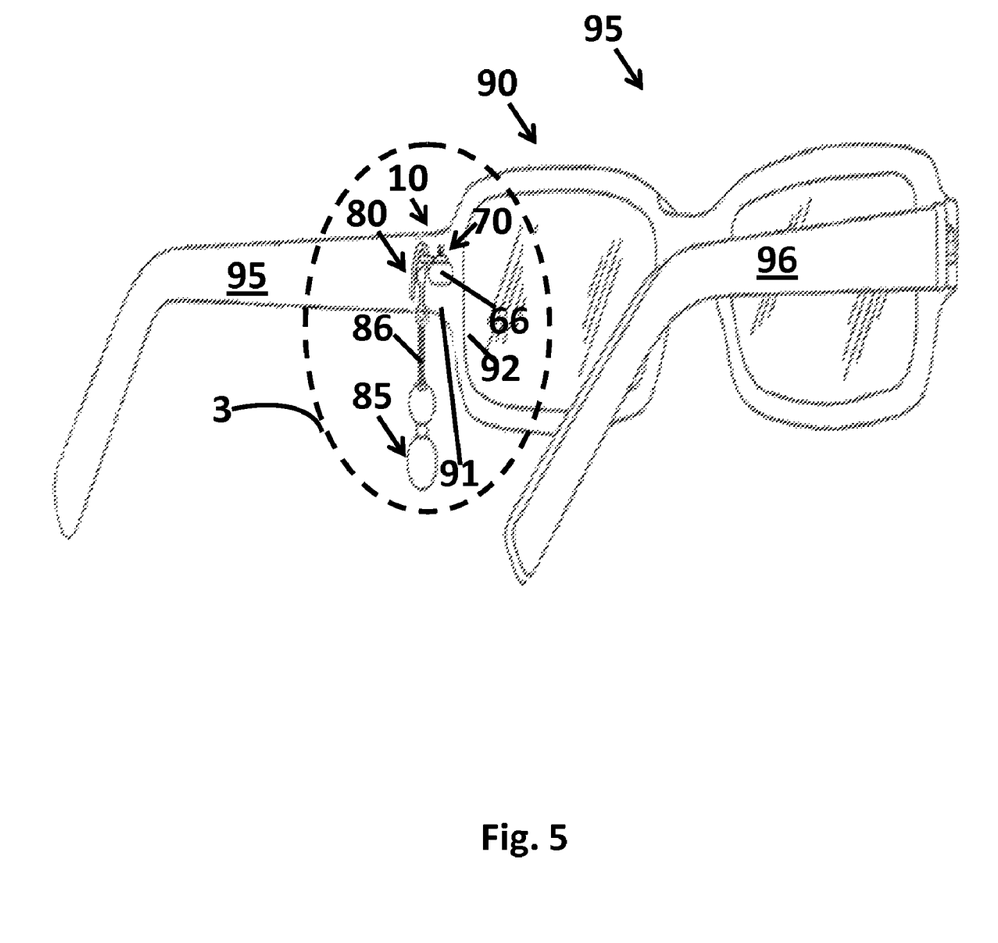
FIG. 5 depicts a side elevation view of an ornamented eyeglass apparatus, in accordance with embodiments of the present invention.

FIG. 3 depicts a longitudinal cross-sectional view of the coupling device 10, depicted in FIG. 2, and an exploded longitudinal cross-sectional view of the coupling device 10, depicted in FIG. 5, after the releasably coupled breakaway tab 37, 72 has been broken off at the breakaway 35, 71 and an ornamental fastener 80 has been operably coupled to the second end 13 of the elongated body 14. The ornamental fastener 80 comprises an eyelet 90, an eyelet opening 83, a shank 87, a lock 82, a bend 84, a grip 88, and an end 81. The end 81 of the ornamental fastener 80 has been inserted into the opening 25 of the second end 13 of the elongated body 14, so that the lock 82 spans the gap 89 between the shank 87 and the grip 88, so that the lock 82 may block removal of the ornamental fastener 80 from the opening 25 of the second end 13 of the elongated body 14.

The eyelet opening 83 may be operably coupled to the ornament 85 using fastener 86, for example a string, of which one end has been threaded through the eyelet opening 83 and tied to the eyelet 90 and the other end tied to an eyelet of the ornament 85 or a split ring washer that connects the eyelet 90 to an eyelet of the ornament 85.

Figure 4:
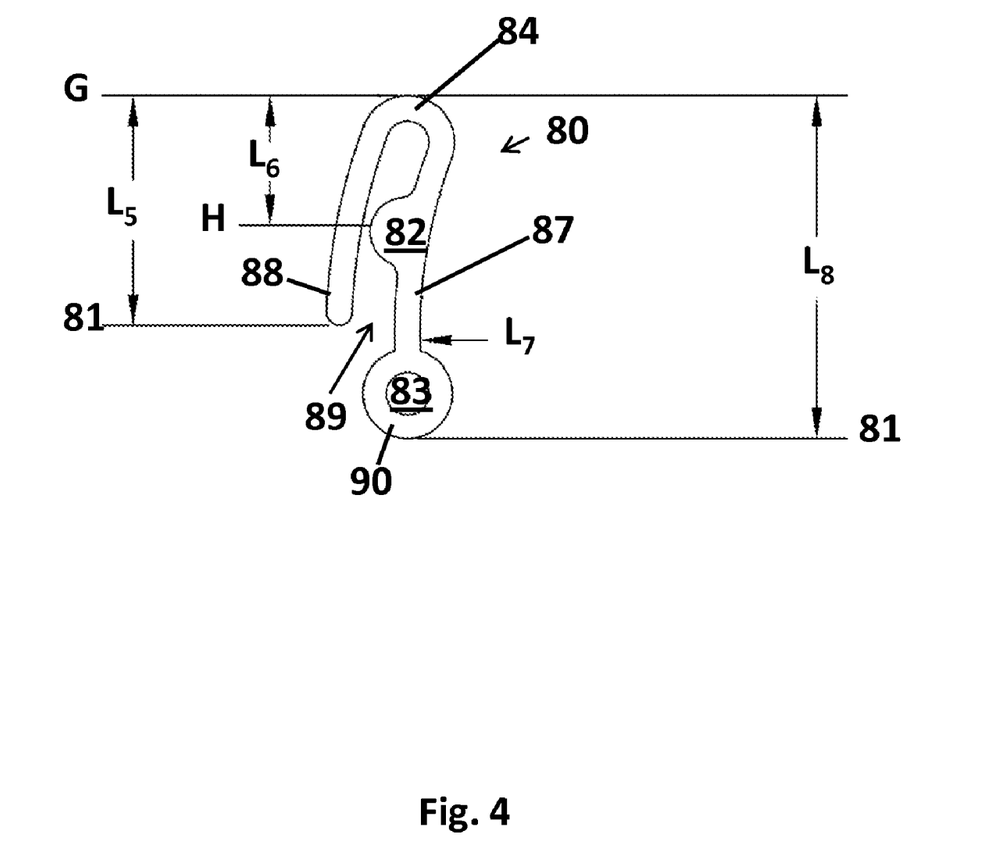
FIG. 4 depicts an exploded longitudinal cross-sectional view of the ornamental fastener 80 depicted in FIG. 3, in accordance with embodiments of the present invention.

FIG. 4 depicts an exploded longitudinal cross-sectional view of the ornamental fastener 80 depicted in FIG. 3. The ornamental fastener 80 comprises an eyelet 90, an eyelet opening 83, a shank 87, a lock 82, a bend 84, a grip 88, and an end 81. The lock 82 spans the gap 89 between the shank 87 and the grip 88, so that the lock 82 may block removal of the ornamental fastener 80 from the opening 25 of the second end 13 of the elongated body 14 when the end 81 of the ornamental fastener 80 has been inserted into the opening 25 of the second end 13 of the elongated body 14.

In one embodiment, a length $L_5$ between an apex G of the bend 84 and the end 81 of the ornamental fastener may be from about 0.24 in. to about 0.30 in. In another embodiment, the length $L_5$ between the tip of the bend 84 and the end 81 of the ornamental fastener may be from about 0.42 in. to about 0.53 in.

In one embodiment, a length $L_6$ between an apex H of the lock 82 and the apex G of the bend 84 may be from about 0.13 in to about 0.17 in. Alternatively, the length $L_6$ between an apex H of the lock 82 and the apex G of the bend 84 may be from about 0.24 in. to about 0.31 in.

In one embodiment, a width $L_7$ of the shank 87 of the ornamental fastener 80 may be from about 0.027 in. to about 0.33 in.

In one embodiment, a width of the gap 89 between the shank 87 and the grip 88 may be from about 0.045 in to about 0.055 in.

In one embodiment, a width of the gap 89 between the shank 87 and the apex H of the lock 82 may be from about 0.01 to 0.02 in.

In one embodiment, a diameter of the eyelet opening 83 may be from about 0.045 in. to about 0.055 in.

In one embodiment, a diameter of the eyelet 90 may be from about 0.095 in. to about 0.115 in.

In one embodiment, a length $L_8$ from the apex G of the bend 84 to the end 81 of the eyelet 90 is from about 0.36 in. to about 0.44 in. Alternatively, the length $L_8$ from the apex G of the bend 84 to the end 81 of the eyelet 90 is from about 0.56 in. to about 0.69 in.

FIG. 5 depicts a side elevation view of an ornamented eyeglass apparatus 95, comprising: an eyeglass frame, first and second side pieces 95, 96, the coupling device 10, the hinge 66 and the screw 70, after the releasably coupled breakaway tab 37, 72 has been broken off at the breakaway 35, 71. An ornamental fastener 80 has been operably coupled to the second end 13 of the elongated body 14. The ornamental fastener 80, also depicted in FIG. 3, and described in associated text, comprises an eyelet 90, an eyelet opening 83, a shank 87, a lock 82, a bend 84, a grip 88, and an end 81.

In one embodiment, the ornamented eyeglass apparatus 100 comprises an eyeglass frame 90. The apparatus having ornamentation 95 has first and second side pieces 95, 96, wherein a proximal end 91 of the first side piece 95 is operably coupled to a first end 92 of the frame 90 by a first hinge 66 therebetween. An ornament 85 may be suspended from the apparatus 95, wherein the ornament 85 is not directly suspended from either of the sidepieces 95, 96 or from a screw 70 in the first hinge 66.

In one embodiment, the ornamented eyeglass apparatus 95 comprises an eyeglass frame 90, a first side piece 95, wherein a proximal end 91 of the first side piece 95 is operably coupled to a first end 92 of the frame 90 by a first hinge 66 therebetween. The ornamented eyeglass apparatus 95 comprises a coupling device 10 operably coupled to the hinge 66, comprising: an elongated body 14 having first and second sections 12, 13, wherein a first surface 50 of each section 12, 13 has an opening 30, 25 therein, wherein the opening 30 in the first surface 50 of the first section 12 has been adapted to receive a screw 70 for operably coupling the coupling device 10 to the hinge 66 and the opening 25 in the first surface 50 of the second section 13 has been adapted to receive an ornamental fastener 80. The coupling device 10 comprises a breakaway tab 37, releasably coupled to the elongated body 14; and a breakaway 35, therebetween. In this embodiment, the breakaway 35 is not between the breakaway tab 37 and an end A of the first section 12 of the elongated body 14.

Figure 6A:
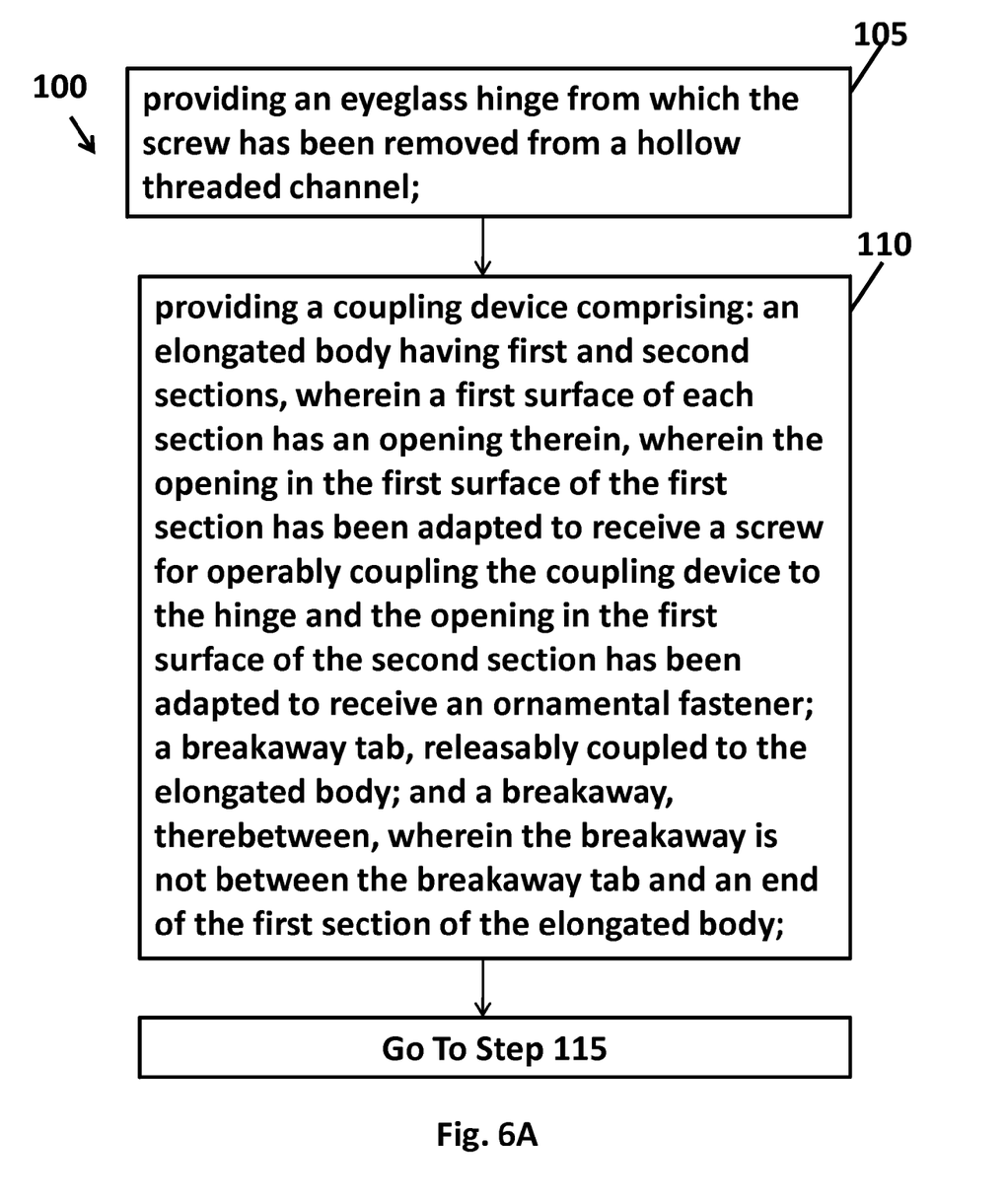
FIGS. 6A-6C depict a flow diagram of a method for inserting a coupling device in an eyeglass hinge, in accordance with embodiments of the present invention.
Figure 6B:
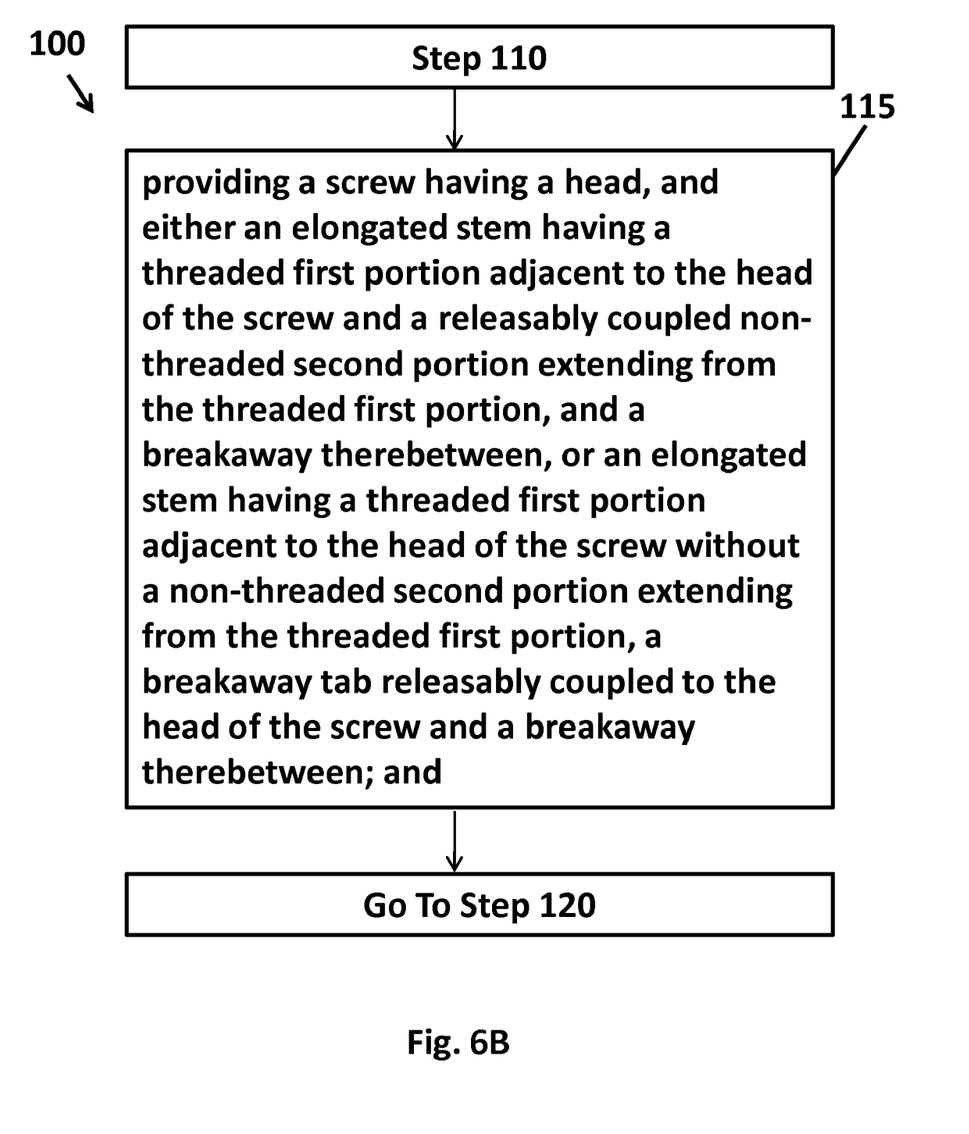
Figure 6C:
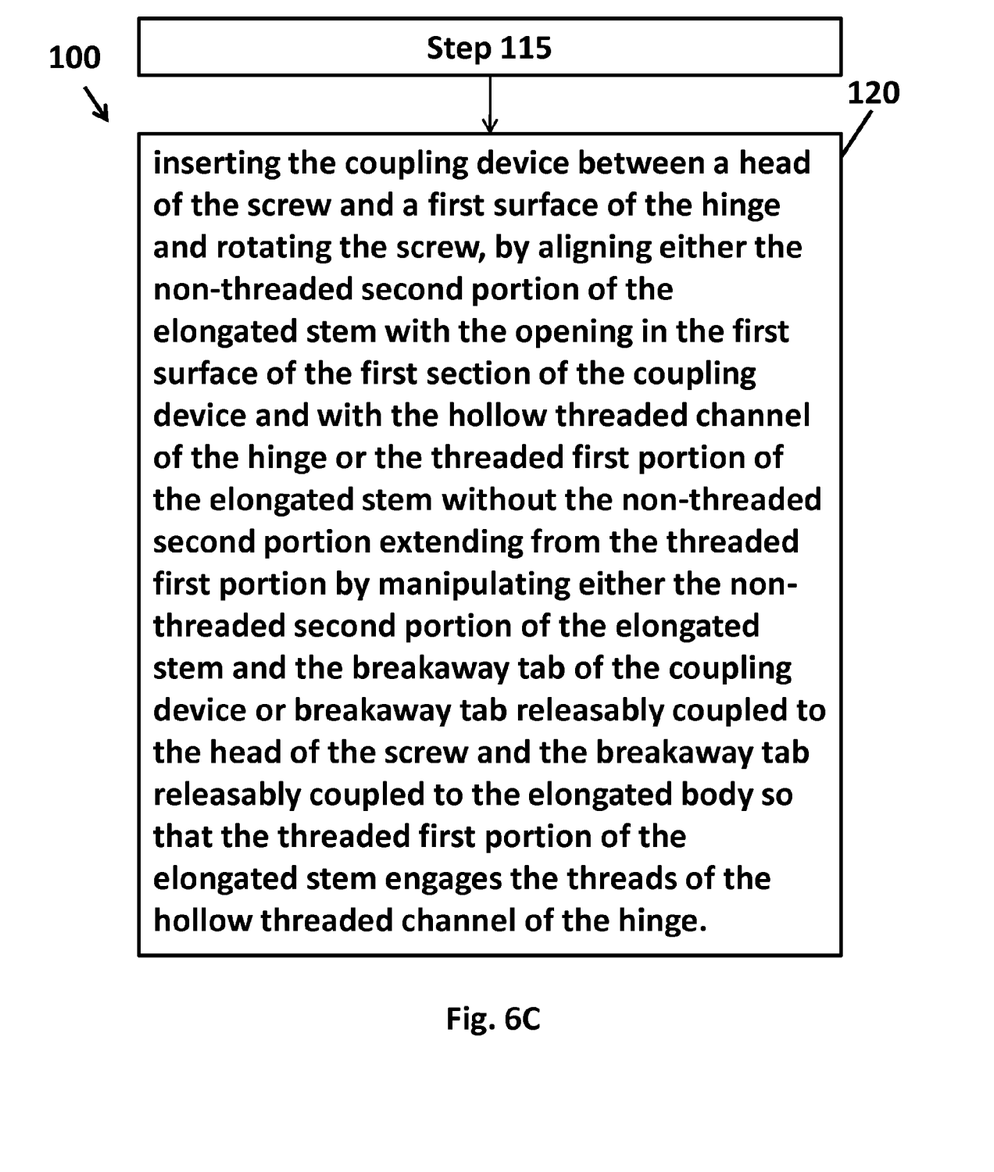

FIGS. 6A-6C depict a flow diagram of a method 100 for inserting a coupling device 10, as depicted in FIGS. 1-5, and described in associated text, herein, in a hinge 66 of an eyeglass frame 90.

A step 105 provides an eyeglass hinge 66 from which the screw 70 has been removed from a hollow threaded channel 64.

A step 110 of the method 100 provides a coupling device 10 comprising: an elongated body 14 having first and second sections 12, 13. A first surface 50 of each section 12, 13 has an opening 30, 25 therein. The opening 30 in the first surface 50 of the first section 12 has been adapted to receive a screw 70 for operably coupling the coupling device 10 to the hinge 66. The opening 25 in the first surface 50 of the second section 13 has been adapted to receive an ornamental fastener 80. The step 110 provides the coupling device 10, further comprising a breakaway tab 37, releasably coupled to the elongated body 14; and a breakaway 35, therebetween, wherein the breakaway 35 is not between the breakaway tab 37 and an end A of the first section 12 of the elongated body 14.

A step 115 of the method 100 provides a screw 70 having a head 77, and either an elongated stem 79 having a threaded first portion 76 adjacent to the head 77 of the screw 70 and a releasably coupled non-threaded second portion 74 extending from the threaded first portion 76, and a breakaway 75 therebetween, or an elongated stem 79 having a threaded first portion 76 adjacent to the head 77 of the screw 70 without a non-threaded second portion 74 extending from the threaded first portion 76, a breakaway tab 72 releasably coupled to the head 77 of the screw 70 and a breakaway 71 therebetween.

A step 120 of the method 100 provides inserting the coupling device 10 between a head 77 of the screw 70 and a first surface 65 of the hinge 66 and rotating the screw 70, by aligning either the non-threaded second portion 74 of the elongated stem 79 with the opening 30 in the first surface 50 of the first section 12 of the coupling device 10 and with the hollow threaded channel 64 of the hinge 66 or the threaded first portion 76 of the elongated stem 79 without the non-threaded second portion 74 extending from the threaded first portion 76 by manipulating either the non-threaded second portion 74 of the elongated stem 79 and the breakaway tab 37 of the coupling device 10 or breakaway tab 72 releasably coupled to the head 77 of the screw 70 and the breakaway tab 37 releasably coupled to the elongated body 14 so that the threaded first portion 76 of the elongated stem 79 engages the threads 63 of the hollow threaded channel 64 of the hinge 66.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

I claim:

1. A coupling device, comprising:
    an elongated body having first and second sections, wherein a first surface of each section has an opening therein,
        wherein the opening in the first surface of the first section has been adapted to receive a screw and the opening in the first surface of the second section has been adapted to receive an ornamental fastener;
    a breakaway tab, releasably coupled to the elongated body; and
    a breakaway, therebetween,
        wherein the breakaway is not between the breakaway tab and an end of the first section of the elongated body.

2. The coupling device of claim 1, wherein the ornamental fastener comprises an eyelet, an eyelet opening, a shank, a bend, a grip, and an end.

3. The coupling device of claim 2, wherein the shank further comprises a lock, wherein the lock, the shank, and the grip are coextensive and coplanar.

4. The coupling device of claim 1, wherein a width of a gap between the shank and the apex of the lock is from about 0.01 to 0.02 in.

5. The coupling device of claim 1, wherein the first surface of the elongated body and a surface of the breakaway tab are coextensive and coplanar.

6. The coupling device of claim 1, wherein the breakaway is between the breakaway tab and the opening adapted to receive the ornamental fastener.

7. The coupling device of claim 1, wherein a head of the screw is releasably coupled to a breakaway tab.

8. The coupling device of claim 1, wherein a width of the breakaway is less than or equal to 0.010 in.+/−10%, and a length of the breakaway is less than or equal to from about 0.005 in. to about 0.007 in. when the diameter of the opening in the first section is from about 0.0675 in. to about 0.0825 in.

9. An ornamented eyeglass apparatus, comprising:
    an eyeglass frame;
        a first side piece, wherein a proximal end of the first side piece is operably coupled to a first end of the frame by a first hinge therebetween;
        a coupling device operably coupled to the hinge, comprising:
            an elongated body having first and second sections, wherein a first surface of each section has an opening therein, wherein the opening in the first surface of the first section has been adapted to receive a screw for operably coupling the coupling device to the hinge and the opening in the first surface of the second section has been adapted to receive an ornamental fastener;
            a breakaway tab, releasably coupled to the elongated body; and
            a breakaway, therebetween,
                wherein the breakaway is not between the breakaway tab and an end of the first section of the elongated body.

10. The ornamented eyeglass apparatus of claim 9, wherein the ornamental fastener comprises an eyelet, an eyelet opening, a shank, a bend, a grip, and an end.

11. The ornamented eyeglass apparatus of claim 10, wherein a lock operably coupled to the shank of the ornamental fastener restricts a gap between the shank and the grip of the ornamental fastener.

\* \* \* \* \*